United States Patent
Loreth

(10) Patent No.: US 9,533,312 B2
(45) Date of Patent: Jan. 3, 2017

(54) METHOD FOR APPLYING A MOISTURE BARRIER TO A PRECIPITATOR FOR A TWO-STEP ELECTROFILTER

(71) Applicant: Andrzej Loreth, Akersberga (SE)

(72) Inventor: Andrzej Loreth, Akersberga (SE)

( * ) Notice: Subject to any disclaimer, the term of this patent is extended or adjusted under 35 U.S.C. 154(b) by 203 days.

(21) Appl. No.: 14/367,329

(22) PCT Filed: Dec. 20, 2012

(86) PCT No.: PCT/SE2012/000212
§ 371 (c)(1),
(2) Date: Jun. 20, 2014

(87) PCT Pub. No.: WO2013/105885
PCT Pub. Date: Jul. 18, 2013

(65) Prior Publication Data
US 2014/0338537 A1    Nov. 20, 2014

(30) Foreign Application Priority Data
Dec. 22, 2011   (SE) .................................. 1100948-7

(51) Int. Cl.
*B03C 3/86* (2006.01)
*B32B 37/14* (2006.01)
(Continued)

(52) U.S. Cl.
CPC . *B03C 3/86* (2013.01); *B03C 3/45* (2013.01); *B03C 3/47* (2013.01); *B03C 3/49* (2013.01); *B03C 3/60* (2013.01); *B32B 37/142* (2013.01)

(58) Field of Classification Search
CPC combination set(s) only.
See application file for complete search history.

(56) References Cited

U.S. PATENT DOCUMENTS 2,243,296 A * 5/1941 Sweetland ............. B01D 39/14
                                                        210/507
3,487,610 A * 1/1970 Burton ...................... B03C 3/28
                                                          156/1
(Continued)

FOREIGN PATENT DOCUMENTS

SE         519 468       3/2003
WO    WO 9746322 A1 * 12/1997 ............... B03C 3/49
(Continued)

OTHER PUBLICATIONS

International Search Report dated Mar. 8, 2013, corresponding to PCT/SE2012/000212.

*Primary Examiner* — Duane Smith
*Assistant Examiner* — Sonji Turner
(74) *Attorney, Agent, or Firm* — Young & Thompson

(57) ABSTRACT

A method for applying a moisture barrier to a precipitator of cardboard for a two-step electrofilter, wherein the precipitator includes at least two paper bands (5) that constitute electrode elements in the precipitator, which paper bands (5) are multiply wound around a center axis of the precipitator, wherein the paper bands (5) exhibit a thin plastic layer with a thickness of 5-50 micrometers on their lateral surfaces (4), and where proximate electrode elements are arranged at a distance from one another in the radial direction of the precipitator. The method is characterized in that edge parts (6) of the paper bands (5) have a moisture-resistant substance applied to them. The material for fabricating a precipitator of cardboard for a two-step electrofilter is also described.

14 Claims, 1 Drawing Sheet

(51) Int. Cl.
*B03C 3/45* (2006.01)
*B03C 3/47* (2006.01)
*B03C 3/49* (2006.01)
*B03C 3/60* (2006.01)

(56) References Cited

U.S. PATENT DOCUMENTS

| | | | | | |
|---|---|---|---|---|---|
| 4,234,324 | A | * | 11/1980 | Dodge, Jr. | B03C 3/40 55/DIG. 5 |
| 4,313,741 | A | * | 2/1982 | Masuda | B03C 3/12 96/78 |
| 4,354,861 | A | * | 10/1982 | Kalt | B03C 3/60 427/121 |
| 5,198,003 | A | * | 3/1993 | Haynes | B03C 3/08 264/259 |
| 5,766,318 | A | * | 6/1998 | Loreth | B03C 3/60 96/69 |
| 5,993,521 | A | * | 11/1999 | Loreth | B03C 3/12 96/69 |
| 6,117,216 | A | * | 9/2000 | Loreth | B03C 3/08 96/100 |
| 6,203,600 | B1 | * | 3/2001 | Loreth | B03C 3/49 264/280 |
| 6,398,852 | B1 | * | 6/2002 | Loreth | B03C 3/32 55/498 |
| 6,471,746 | B2 | * | 10/2002 | Hagglund | B03C 3/12 55/521 |
| 2004/0182243 | A1 | * | 9/2004 | Loreth | B03C 3/08 96/83 |
| 2007/0240571 | A1 | * | 10/2007 | Loreth | B03C 3/08 96/52 |
| 2012/0152123 | A1 | * | 6/2012 | Loreth | B03C 3/80 96/40 |

FOREIGN PATENT DOCUMENTS

| | | |
|---|---|---|
| WO | 2005035132 | 4/2005 |
| WO | 2011028162 | 3/2011 |

* cited by examiner

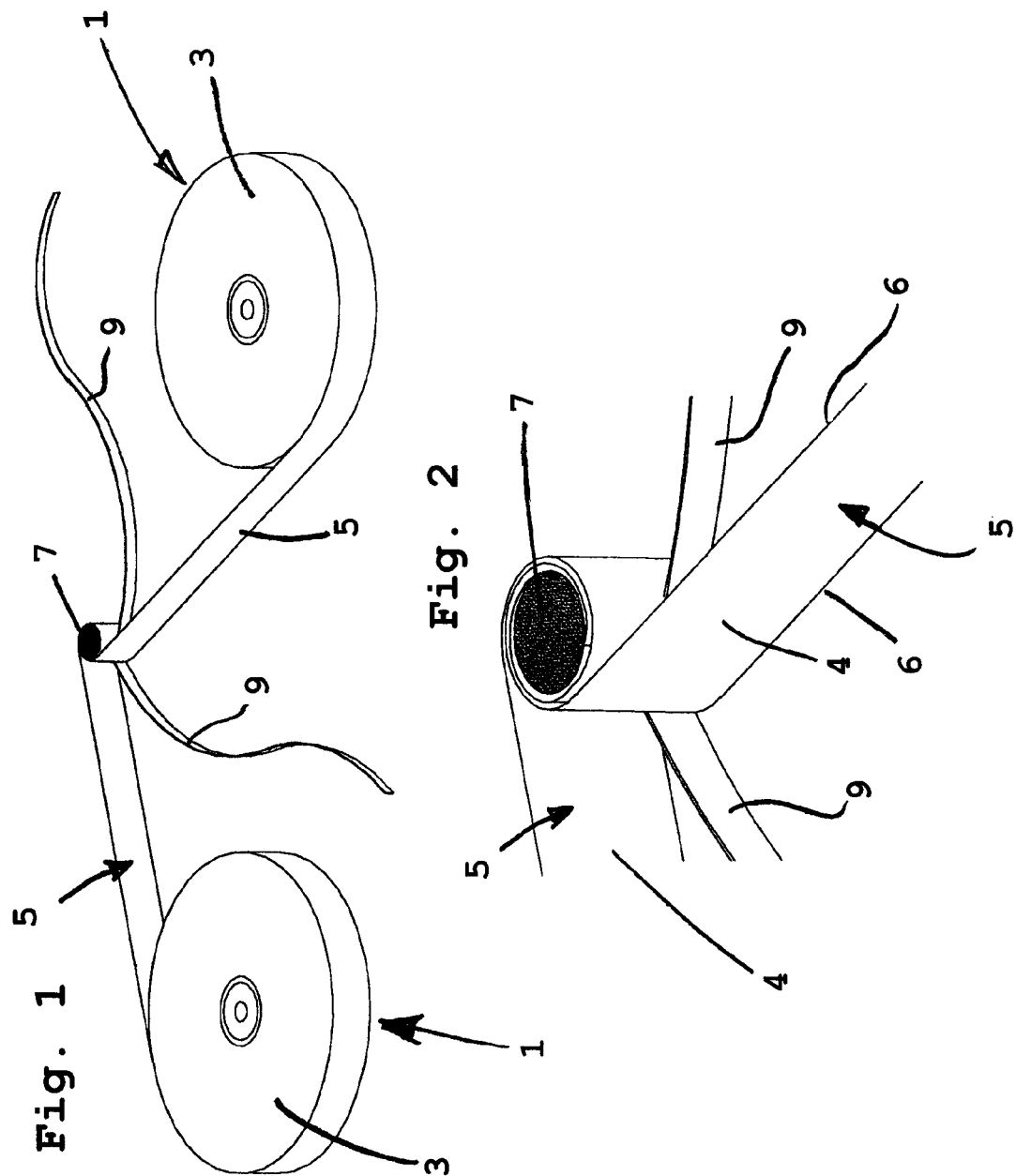

METHOD FOR APPLYING A MOISTURE BARRIER TO A PRECIPITATOR FOR A TWO-STEP ELECTROFILTER

TECHNICAL FIELD OF THE INVENTION

The present invention concerns a method for applying a moisture barrier to a precipitator for a two-step electrofilter, wherein the precipitator consists of at least two band-like electrode elements of cardboard, which are multiply wound around a central axis, wherein the electrode elements are coated on their lateral surfaces with a thin plastic layer, and wherein proximate electrode elements are arranged at a distance from one another in the radial direction of the precipitator. The invention also concerns a material for fabricating a precipitator.

STATE OF THE ART

A strong focus in recent years on better quality in indoor air combined with more efficient energy use has generated interest in particle filter technologies other than those based on the use of various fibers. The so-called two-step electrofilter constitutes one such technology that does not use fibers.

Recent advances in electrofilters have led to efficient particle filter solutions with much broader areas of application, in that these electrofilters are based on the use of highly resistant materials, including cardboard, in the design of the so-called precipitator instead of using metallic electrode elements.

U.S. Pat. No. 6,203,600 describes a two-step electrofilter with an ionization section which, on the downstream side as viewed from the direction of airflow through the device, is followed by a so-called precipitator. The precipitator consists of two band-like electrode elements of cardboard, which are multiply wound around a bobbin and with gap spacing in the radial direction of the precipitator between proximate electrode elements. Such a precipitator comprises a nearly cylindrical body. Airflow through the precipitator occurs in the axial direction and through gaps that are open to the airflow and which are formed in the radial direction of the precipitator between the proximate electrode elements.

A further advancement of the cardboard precipitator has been described in SE-B-519 468. According to that document, the moisture has a significant influence on the electrostatic field, and thus on the separating capacity of the precipitator. The proposed solution has significantly improved the separating capacity of the precipitator by means of specially designed paper plastic-coated with a thin polyethylene layer. The problem still remains in the sense that the penetration of the moisture through the edges of the condenser electrodes reduces the resistance of the paper and, in turn, the separating capacity of the precipitator.

OBJECTS AND FEATURES OF THE INVENTION

One primary object of the present invention is, in principle, to eliminate the penetration of moisture into the edge sections of the precipitator, e.g. in connection with the occurrence of a sprinkling of water or other suitable liquid on the edge sections. This sprinkling can occur in connection with cleaning of the precipitator.

An additional object of the present invention is to describe a method that achieves, in an efficient and production-friendly way, an elimination of the penetration of moisture into the edge sections of the precipitator.

At least the primary object of the present invention is achieved by means of a method that has been given the features specified in the following independent claim 1 Preferred embodiments of the invention are defined in the independent claims.

BRIEF DESCRIPTION OF THE DRAWING

A preferred embodiment of the invention is described below with reference to the accompanying drawing, in which:

FIG. 1 schematically shows the fabrication of a precipitator, in connection with which fabrication the method for applying a moisture barrier can be applied, and FIG. 2 shows part of FIG. 1 in enlarged scale.

DETAILED DESCRIPTION OF A PREFERRED EMBODIMENT OF THE METHOD ACCORDING TO THE INVENTION

The material for the precipitator according to the aforementioned Swedish patent applications/patent consists of long paper bands that are delivered on a roll. The width of the rolls corresponds to the width of the bands, and the diameter of the roll can be up to 1-2 meters. The rolls consist of a tightly wound paper band, which means that the longitudinal edge parts of the paper bands form the end surfaces of the roll.

FIG. 1 shows two rolls 1, each of which comprises a tightly wound paper band 5. The tightly wound paper band 5 defines two end surfaces 3, only the one of which is visible in FIG. 1. The paper band 5 is coated on both of its lateral surfaces 4 with a layer of polyethylene plastic, wherein this layer has a thickness of 5-300 micrometers, preferably 10-30 micrometers.

The method according to the present invention, which will be defined in the claims, consists preferably in that the end surfaces 3 of the tightly wound rolls 1 are coated with a moisture-resistant substance, preferably a varnish, which according to the preferred procedure can consist of a traditional spar varnish (see below). Coating with the substances occurs at least one time, and preferably two to three times (wet in wet), i.e. a new coat is applied before the previous coat has had time to dry. Naturally it is suitable for both end surfaces 3 of the paper rolls 1 to be treated in this manner. An impregnation of the flat end surfaces 3 of the tightly wound paper rolls 1 thus occurs when a preferred moisture-resistant substance is used.

It has surprisingly been found in connection with the fabrication of the precipitator, see FIGS. 1 and 2, during which the paper band 5 is wound off of the tightly wound roll 1, that the thin varnish layer that covers both end surfaces 3 of the roll 1 breaks without damaging the paper band 5. As a result, the unwinding of the paper band 5 can advantageously occur before the varnish has dried through. It must be noted in this context that, due to the tight winding of the roll 1, the varnish does not penetrate down between the windings of the band to any significant extent. This prevents the windings of the band from being adhered together. In this context it must also be noted that the layer of polyethylene plastic that covers the paper does not bind to the varnish, even if the varnish does penetrate between the windings of the paper band 5. The specified method does, however, lead to a satisfactory moisture barrier being imparted to the edge parts 6 of the paper band 5 via the applied varnish. The varnish penetrates into the edge parts 6 and forms an exceptionally effective moisture barrier that extends between the lateral surfaces of the plastic layer disposed on the paper band 5.

As FIGS. 1 and 2 show, the paper bands 5 are caused to revolve around a bobbin body 7 for forming the precipitator. Spacer strips 9 are thereby disposed between the paper bands 5, whereupon said spacer strips 9 are removed after the paper bands incorporated in the precipitator have been mutually fixed in an appropriate manner. Reference is made in this context to U.S. Pat. No. 6,203,600.

Varnish from the manufacturer, International Original, which is a traditional spar varnish, is used in laboratory experiments. The present invention is naturally not limited to this type of varnish.

The method according to the invention is, however, limited to paper that is coated on its lateral surfaces with a 5-300, preferably 10-30, micrometers-thick plastic layer, preferably a layer of polyethylene plastic, and to a varnish or the equivalent that does not adhere to said plastic layer. Paper coated with a polyethylene layer and the type of varnish described above meets these requirements. Surprisingly enough, it has been found that, despite a lack of adhesion between the varnish and the plastic layer, satisfactory sealing of the edge sections is achieved so that a method according to the invention will, in principle, stop any penetration of moisture into the paper bands.

Conceivable Modifications of the Invention

A varnish, preferably of the spar varnish type, which penetrates into the edge parts, is used in the preferred embodiment of the invention described above. One can naturally also conceive, within the scope of the present invention, of using other moisture-resistant substances. Paints of suitable quality or a plastic film that is applied to the edge part may be mentioned for exemplary and non-limiting purposes.

A polyethylene plastic is used as a coating on the lateral surfaces of the paper band 5 in the preferred embodiment of the invention described above. However, within the framework of the present invention one can conceive of other types of plastic materials that have corresponding properties, primarily insofar as the varnish must not adhere to the plastic.

Within the scope of the present invention one can also conceive that the varnish impregnation of the edge parts 6 of the paper band 5 could occur in a manner other than that described above. The impregnation of the edge parts 6 could thus occur as the paper band 5 is being wound off of the tightly wound roll 1. The edge parts 6 would in this case be caused to move past some suitable coating device that applies varnish to the edge parts 6. This could be realized as an intermediate step before the actual precipitator is assembled.

An additional alternative with regard to the impregnation of the edge parts 6 is that the edge parts 6 of the finished precipitator could be dipped in varnish, which would then adhere to the edge parts 6.

With regard to the aforedescribed bobbin 7, it can be designed in multiple ways, although it must consist of a center unit from which the at least two paper bands 5 proceed when the precipitator is to be fabricated. It is also possible that the bobbin 7 is removed once the paper bands 5 have been fully disposed and mutually fixed. Both the bobbin and the center unit define a center axis that also comprises the center axis of the precipitator.

The invention claimed is:

1. A method for applying a moisture barrier to a precipitator of cardboard for a two-step electro filter, comprising:
   tightly winding at least two paper bands around a center axis to yield a tightly wound roll defining two end surfaces, each paper band having a thin plastic layer on a lateral surface;
   applying a moisture-resistant substance to the at least one end surface of the tightly wound roll so that the at least one end surface is coated with the moisture-resistant substance;
   drying the moisture-resistant substance; and
   winding off the tightly wound roll to form the precipitator, the precipitator comprising electrode elements arranged at a proximate distance from one another in a radial direction.

2. The method according to claim 1, wherein applying the moisture-resistant substance is by at least one coating of the at least the one end surface.

3. The method according to claim 2, wherein applying the moisture-resistant substance occurs a plurality of times, and a subsequent coating occurs before the moisture-resistant substance from the previous coating has had time to dry.

4. A material for fabricating a precipitator of cardboard for a two-step electrofilter, comprising;
   at least two band electrode elements of cardboard, which are multiply wound on a center axis of the precipitator;
   a thin plastic layer with a thickness of 5-50 micrometers on each electrode element; and
   electrode elements arranged at a proximate distance from one another in a radial direction of the precipitator, wherein
   the material for the precipitator is a tightly wound roll of a paper band coated with a thin plastic layer, the material of the tightly wound roll having two end surfaces, and at least the one end surface is coated with a moisture-resistant substance.

5. The material according to claim 4, wherein the end surface is coated with multiple layers of the moisture-resistant substance.

6. The material according to claim 4, wherein the moisture-resistant substance is a varnish.

7. The material according to claim 5, wherein the moisture-resistant substance is a varnish.

8. The method according to claim 1, wherein the thin plastic layer is formed from polyethylene.

9. The method according to claim 1, wherein the thin plastic layer has a thickness of 5-300 micrometers.

10. The method according to claim 1, wherein the thin plastic layer has a thickness of 10-30 micrometers.

11. The method according to claim 1, wherein the wherein the moisture-resistant substance is a varnish.

12. The method according to claim 11, wherein the wherein the varnish does not bind to the thin plastic layer.

13. The material according to claim 4, wherein the thin plastic layer is formed from polyethylene.

14. The material according to claim 6, wherein the varnish does not bind to the thin plastic layer.

* * * * *